Patented Aug. 23, 1932

1,873,520

UNITED STATES PATENT OFFICE

HENRY T. WOODWARD, OF NORTH PALO ALTO, CALIFORNIA, ASSIGNOR TO CALIFORNIA CHEMICAL CORPORATION, OF NEWARK, CALIFORNIA, A CORPORATION OF ILLINOIS

PROCESS OF MAKING A FILTERING, BLEACHING, AND INSULATING MATERIAL

No Drawing.   Application filed May 25, 1931.   Serial No. 539,995.

This invention relates to that class of materials sometimes termed adsorbents, and used in powdered form for filtering, bleaching or decolorizing various solutions, a further property of the present material being that of a heat insulator.

The objects of the invention are to provide an improved process for the production of a magnesium silicate material having the above characteristics.

Magnesium silicates existing in various forms and admixtures both in nature and through various processes of manufacture have been found to vary considerably in the desirable properties above mentioned, probably both through their exact chemical formula as well as their peculiar physical structure, the latter being the combined result of the exact chemical constituents and process to which they have been subjected.

Thus, reaction products of magnesium and silica, lime and silica, etc., yielding various silicates, have been disclosed in numerous patents and which products varied greatly in the characteristics mentioned.

In carrying on a considerable investigation in the production of these materials I have discovered a novel method or process for the preparation of a magnesium silicate combining the characteristics noted to a degree making it of unusual value in industry, especially in the bleaching of oils and other organic liquids, while at the same time having superior qualities as an insulator of heat when used as a covering for retorts, pipes, etc.

The product of the reaction is believed to be a magnesium silicate of some form, and is set up between a borate of magnesium and some form of siliceous material in the presence of water and heat.

There are a number of magnesium borates described in the literature on the subject, any of which may be used, but preference is given to the more alkaline borates, or those containing more magnesium oxide in proportion to the boric acid, or a mixture of two or more borates may be used.

Some of the magnesium borates experimented with are as follows:—

$3MgO.B_2O_3$ $2MgO.B_2O_3$ (This occurs with water of hydration in two distinct forms, as ascharite and camsellite.)

$MgO.B_2O_3$ (This occurs with water of hydration as pinnoite.)

and $MgO.3B_2O_3$

The nature of the silica used is also open somewhat to choice, depending on the availability of the material and exact character of the product desired, for practically any form of pure or impure silica will serve in the reaction, though for fastest reaction either a hydrated silica such as opalite, or a silica having a greatly extended surface per unit of weight, such as diatomaceous earth should be employed. However, sand, quartz, or any of the various forms of commercially pure silica can be used, and also certain grades of impure silica such as various kinds of highly siliceous rocks.

Whichever form of siliceous material is used should be in finely ground condition to promote speed of reaction, as the reaction appears to work progressively inward on the particles.

The reaction may be generally stated as follows:

$MgO.B_2O_3 + SiO_2 = MgO.SiO_2 + B_2O_3$

The boric anhydride or $B_2O_3$ shown as a resultant of the reaction will at once revert to boric acid, $H_3BO_3$ in the presence of water.

Any of the borates to be used can be made by adding commercial boric acid to magnesium oxide, magnesium hydrate, or artificial magnesium carbonate suspended in water. Reaction between the magnesium oxide or hydrate and boric acid proceeds at ordinary temperatures, but if the carbonate is used the solution should best be boiled. It is not necessary to separate the magnesium borate from the aqueous liquor in which it is suspended, as the suspension or slurry of magnesium borate can be used as part of the charge for the reaction. A magnesium borate suitable for my reaction can also be produced by the action of ordinary sodium borate or borax on a solution of a magnesium salt, as magnesium chloride or sulphate.

In carrying out the process a slurry of magnesium borate containing from about 50% to 90% of water (either made from the salt or by reaction between boric acid and magnesium hydrate, as explained above) is used. To this is introduced an amount of siliceous material containing silica corresponding to between 1 part and 4 parts of silica per part of magnesium oxide present in the magnesium borate.

Products may be produced in which the ratio of silica to magnesium oxide falls outside of even these rather wide limits but products having the most desirable characteristics will fall within this range. The proportion of 1 part of magnesium oxide present in magnesium borate in the reaction solution to 2 parts of silica by weight seems to represent an optimum ratio for good reaction speed and satisfactory properties in the finished product.

The aqueous mixture of materials is heated and preferably kept in agitation either mechanically or by ebullition with steam, and to hasten the reaction it is best to carry it on in a closed container so that the temperature can be raised above boiling at atmospheric pressure, and of course, in common with most similar reactions, the greater the heat and pressure within reasonable limits, the quicker the reaction will be completed.

In practice steam pressures of about 300 or 400 pounds per square inch are found satisfactory in permitting completion of the reaction in about two hours time, depending on the fineness of division and nature of the silica used.

So far as is known higher steam pressures and corresponding temperatures perform no other function than that of accelerating the reaction, but which will go on very slowly even in the cold, increasing to a moderate speed at boiling, and further increasing as the temperature and pressure are raised.

When the reaction is completed, and which with a given set of conditions may be easily predetermined, the product is separated from the liquor by any preferred means, and washed if desired to remove the remaining boric acid or other solubles.

As a typical example of the reaction the following description of the preparation of a batch of material can be given: 100 grams of magnesium oxide and 100 grams of commercial boric acid were added to 2 liters of water and agitated together while being heated to boiling. Reaction between the acid and the base resulted with formation of a magnesium borate, approximately the $3MgO.B_2O_3$ described in the literature. To this slurry of magnesium borate 180 grams of powdered diatomaceous earth was added. The slurry was placed in an auto-clave and heated to a steam pressure of 350 pounds for two hours. Reaction product was filtered, washed and dried. It bleached both vegetable and mineral oils and had the characteristic of high volume per unit weight necessary for an insulating material.

It is, of course, not necessary to adhere closely to the proportion of materials indicated above. In particular the quantity of water used is larger than is essential for satisfactory carrying out of the reaction.

It should be noted that the boric acid occurring as a part of the magnesium borate used as one of the materials employed in the reaction finally appears as free boric acid dissolved in the water in which the final product is suspended. Essentially all of the boric acid used is accordingly recovered in the form of an aqueous solution when the product is filtered and washed. The acid present in filtrate and washings can be used for the preparation of another batch of magnesium borate.

The product of the reaction is useful in the bleaching of animal and vegetable oils, being applied in essentially the same fashion as any of the well known bleaching materials, fuller's earth, etc. The product also has desirable properties for use as a heat insulator; thus, it can be mixed with asbestos or similar binder material and molded into desired forms for pipe covering or similar applications. It has the insulating properties of basic magnesium carbonate but the shapes prepared from it are tougher and stronger and resist the application of high temperatures better than the shapes prepared from basic magnesium carbonate.

I have also discovered that products somewhat similar to the above may be produced by the use of other borates, particularly the two calcium borates, $2CaO.B_2O_3$ and $CaO.B_2O_3$. It is of course well known that lime itself will react with silica, but the silicate product obtained from these borates in the general manner described have valuable characteristics not found in calcium silicates formed in the known manner.

Having thus described my improved process of producing the material described, I claim:—

1. The process of making a material of the character described, which comprises reacting silica with a borate of an alkaline earth metal in the presence of moisture and separating the material formed from the liquor.

2. The process of making a material of the character described, which comprises reacting silica with a borate of an alkaline earth metal in the presence of moisture, removing free boric acid from the material and drying the latter.

3. The process of making a material of the character described, which comprises reacting silica with a borate of an alkaline earth metal in the presence of moisture, heat and pressure, and separating the material formed from the liquor.

4. The process of making a material of the character described, which comprises reacting silica with a borate of an alkaline earth metal in the presence of moisture and heat while agitating the mixture, and separating the material formed from the liquor.

5. The process of making a material of the character described, which comprises reacting silica with a magnesium borate in the presence of moisture and seaparating the material formed from the liquor.

6. The process of making a material of the character described which comprises forming a slurry of magnesium borate and water, incorporating a quantity of finely divided silica, heating the mixture to accelerate reaction of the ingredients and separating the material formed from the liquor.

7. The process of making a material of the character described which comprises mixing together water, magnesium hydrate, and boric acid for reaction to form a slurry of magnesium borate and incorporating finely divided silica therein for further reaction to form a magnesium silicate.

8. The process of making a material of the character described which comprises mixing together water, magnesium hydrate, and boric acid for reaction to form a slurry of magnesium borate and incorporating finely divided silica therein for further reaction under the aid of heat and pressure to form a magnesium silicate.

HENRY T. WOODWARD.